United States Patent
Laureano et al.

(10) Patent No.: US 11,162,369 B1
(45) Date of Patent: Nov. 2, 2021

(54) TURBINE BLADE COOLING HOLE COMBINATION

(71) Applicant: Raytheon Technologies Corporation, Farmington, CT (US)

(72) Inventors: Pedro David Laureano, Jacksonville, FL (US); John A. Lucena, Aguadilla, PR (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/866,130

(22) Filed: May 4, 2020

(51) Int. Cl.
*F01D 5/18* (2006.01)
*F01D 5/20* (2006.01)

(52) U.S. Cl.
CPC .............. *F01D 5/186* (2013.01); *F01D 5/20* (2013.01); *F05D 2220/323* (2013.01); *F05D 2240/303* (2013.01); *F05D 2240/304* (2013.01); *F05D 2240/305* (2013.01); *F05D 2240/81* (2013.01); *F05D 2260/202* (2013.01)

(58) Field of Classification Search
CPC . F01D 5/186; F01D 5/20; F01D 5/187; F01D 9/065; F05D 2240/305; F05D 2260/202; F05D 2240/81; F05D 2240/304; F05D 2240/303
See application file for complete search history.

(56) References Cited

U.S. PATENT DOCUMENTS

| | | | |
|---|---|---|---|
| 7,244,101 B2 * | 7/2007 | Lee | F01D 5/082 416/97 R |
| 8,641,368 B1 * | 2/2014 | Liang | F01D 5/186 415/115 |
| 9,249,673 B2 * | 2/2016 | Ellis | F01D 5/187 |
| 9,630,277 B2 * | 4/2017 | Lee | F01D 5/145 |
| 10,001,013 B2 * | 6/2018 | VanTassel | F01D 5/187 |
| 2011/0223005 A1 * | 9/2011 | Lee | B23P 6/007 415/115 |
| 2016/0160654 A1 * | 6/2016 | Ennacer | F01D 9/041 60/806 |
| 2017/0145831 A1 * | 5/2017 | Bunker | F01D 9/02 |
| 2018/0163551 A1 * | 6/2018 | Forbes | F01D 9/065 |
| 2019/0211690 A1 * | 7/2019 | LoRicco | F01D 9/065 |

\* cited by examiner

*Primary Examiner* — Eldon T Brockman
(74) *Attorney, Agent, or Firm* — Carlson, Gaskey & Olds, P.C.

(57) ABSTRACT

A turbine blade includes an airfoil, a platform and a suction pocket positioned under the platform on a suction side. The suction pocket includes a platform underside, and a fillet connecting the platform underside into a neck. The neck extends into a fir tree. A first cooling hole extends from a first end in the platform underside to a second end in a top surface of the platform. A second cooling hole extends from a first end in the platform underside, but closer to the fillet than is the first end of the first cooling hole, to a second end in the top surface. There is a third cooling hole having a first end in the fillet and extending to a second end at the top surface. A gas turbine engine is also disclosed.

20 Claims, 5 Drawing Sheets

TURBINE BLADE COOLING HOLE COMBINATION

BACKGROUND

This application relates to a cooling hole for cooling a gas turbine engine turbine blade side wall and platform.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands across the turbine section to drive the compressor and the fan section.

The turbine section is subject to high temperature. A turbine typically include a disk with a plurality of circumstantially spaced blades having an airfoil and a platform. A root extends beneath the platform and secures the turbine blade within the disk.

Cooling holes are placed about the turbine blade, including the airfoil, the platform and the root.

SUMMARY

In a featured embodiment, a turbine blade includes an airfoil including a pressure side and a suction side. A platform includes a pressure side wall and a suction side wall and has a leading edge end wall and a trailing edge end wall. A suction pocket is positioned under the platform on the suction side. The suction pocket includes a platform underside, and a fillet connecting the platform underside into a neck. The neck extends into a fir tree. There are at least three cooling holes. A first cooling hole extends from a first end in the platform underside to a second end in a top surface of the platform along a direction having a component toward the suction side wall, and having a component towards the trailing edge end wall. There is a second cooling hole extending from a first end in the platform underside, but closer to the fillet than is the first end of the first cooling hole, to a second end in the top surface along a direction having a component toward the pressure side end wall and a component toward the trailing edge. There is a third cooling hole having a first end in the fillet and extending to a second end at the top surface along a direction and having a component toward the pressure side end wall and another component towards the trailing edge end wall.

In another embodiment according to the previous embodiment, there is a fourth cooling hole having a first end in the fillet and extending to a second end in the upper surface along a direction having a component towards the pressure side end wall and another component towards the trailing edge end wall.

In another embodiment according to any of the previous embodiments, the first end of the second cooling hole is within 1-3 diameters of the second cooling hole from an edge of the fillet at the platform underside.

In another embodiment according to any of the previous embodiments, the second end of the first cooling hole at the upper surface of the platform is within 4 diameters of the first cooling hole measured from the suction side end wall.

In another embodiment according to any of the previous embodiments, there are at least three other cooling hole ends in the upper surface of the platform within a distance of 4 diameters of the first cooling hole measured from the suction side end wall.

In another embodiment according to any of the previous embodiments, the component through which the direction of the second cooling hole extends towards the trailing edge is greater than the component of the direction towards the trailing edge side wall for the third and the fourth cooling holes.

In another embodiment according to any of the previous embodiments, the second end of the second cooling hole is closer to the trailing edge side wall than is the second end of the third cooling hole, but further from the trailing edge side wall than the second end of the fourth cooling hole.

In another embodiment according to any of the previous embodiments, the directions through which the first, second, third and fourth cooling holes extend form an angle with the top surface of the platform. The angle associated with the first cooling hole is greater than the angles associated with the second, third and fourth cooling hole.

In another embodiment according to any of the previous embodiments, the component through which the direction of the second cooling hole extends towards the trailing edge is greater than the component of the direction towards the trailing edge side wall for the third and the fourth cooling holes.

In another embodiment according to any of the previous embodiments, the second end of the second cooling hole is closer to the trailing edge side wall than is the second end of the third cooling hole, but further from the trailing edge side wall than the second end of the fourth cooling hole.

In another embodiment according to any of the previous embodiments, the directions through which the first, second, third and fourth cooling holes extend form an angle with the top surface of the platform. The angle associated with the first cooling hole is greater than the angles associated with the second, third and fourth cooling holes.

In another featured embodiment, a gas turbine engine includes a compressor section, a combustor, a turbine section having at least one turbine blade, and at least one turbine blade. The turbine blade includes an airfoil including a pressure side and a suction side. A platform includes a pressure side wall and a suction side wall and has a leading edge end wall and a trailing edge end wall. A suction pocket is positioned under the platform on the suction side. The suction pocket includes a platform underside. A fillet connects the platform underside into a neck. The neck extends into a fir tree. There are at least three cooling holes, with a first cooling hole extending from a first end in the platform underside to a second end in a top surface of the platform along a direction having a component toward the suction side wall, and having a component towards the trailing edge end wall. There is a second cooling hole extending from a first end in the platform underside, but closer to the fillet than is the first end of the first cooling hole, to a second end in the top surface along a direction having a component toward the pressure side end wall and a component toward the trailing edge. There is a third cooling hole having a first end in the fillet and extending to a second end at the top surface along a direction and having a component toward the pressure side end wall and another component towards the trailing edge end wall.

In another embodiment according to the previous embodiment, there is a fourth cooling hole having a first end in the fillet and extending to a second end in the top surface, along a direction having a component towards the pressure side end wall and another component towards the trailing edge end wall.

In another embodiment according to any of the previous embodiments, the first end of the second cooling hole is within 1-3 diameters of the second cooling hole from an edge of the fillet at the platform underside.

In another embodiment according to any of the previous embodiments, the second end of the first cooling hole at the upper surface of the platform is within 4 diameters of the first cooling hole measured from the suction side end wall. There are at least three other cooling hole ends in the upper surface of the platform within a distance of 4 diameters of the first cooling hole measured from the suction side end wall.

In another embodiment according to any of the previous embodiments, the second end of the second cooling hole is closer to the trailing edge side wall than is the second end of the third cooling hole, but further from the trailing edge side wall than the second end of the fourth cooling hole.

In another embodiment according to any of the previous embodiments, the directions through which the first, second, third and fourth cooling holes extend form an angle with the top surface of the platform. The angle associated with the first cooling hole is greater than the angles associated with the second, third and fourth cooling holes.

In another embodiment according to any of the previous embodiments, the component through which the direction of the second cooling hole extends towards the trailing edge is greater than the component of the direction towards the trailing edge side wall for the third and the fourth cooling holes.

In another embodiment according to any of the previous embodiments, the second end of the second cooling hole is closer to the trailing edge side wall than is the second end of the third cooling hole, but further from the trailing edge side wall than the second end of the fourth cooling hole.

In another embodiment according to any of the previous embodiments, the directions through which the first, second, third and fourth cooling holes extend form an angle with the top surface of the platform. The angle associated with the first cooling hole is greater than the angles associated with the second, third and fourth cooling holes.

These and other features can be better understood from the specification and drawings.

DETAILED DESCRIPTION

Figure 1:
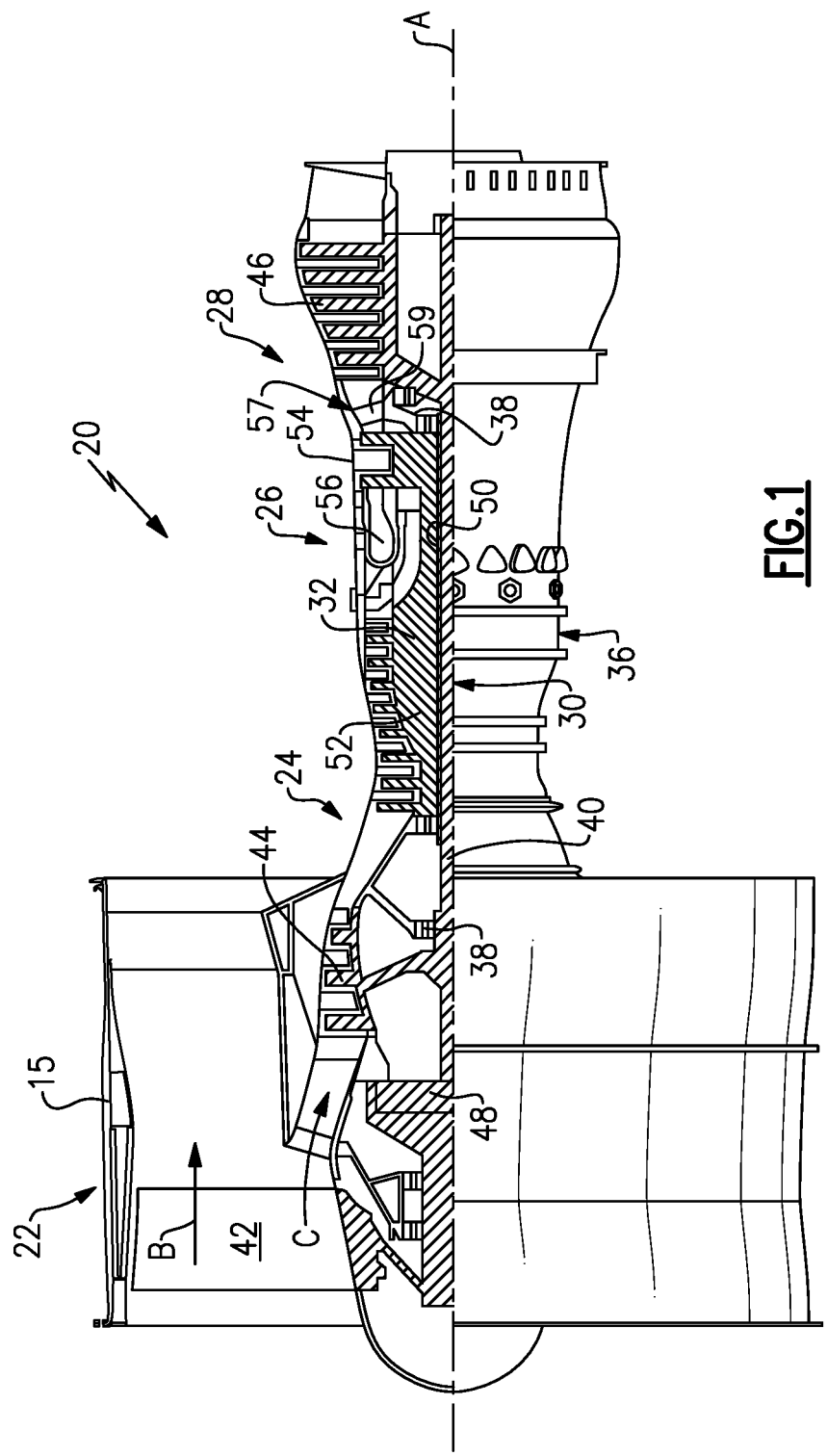
FIG. 1 is a schematic view of an example gas turbine engine according to a first non-limiting example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15, such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°\text{R})/(518.7°\text{R})]^{0.5}$. The "Low corrected fan tip speed" as disclosed herein according to one non-limiting embodiment is less than about 1150 ft/second (350.5 meters/second).

Figure 2A:
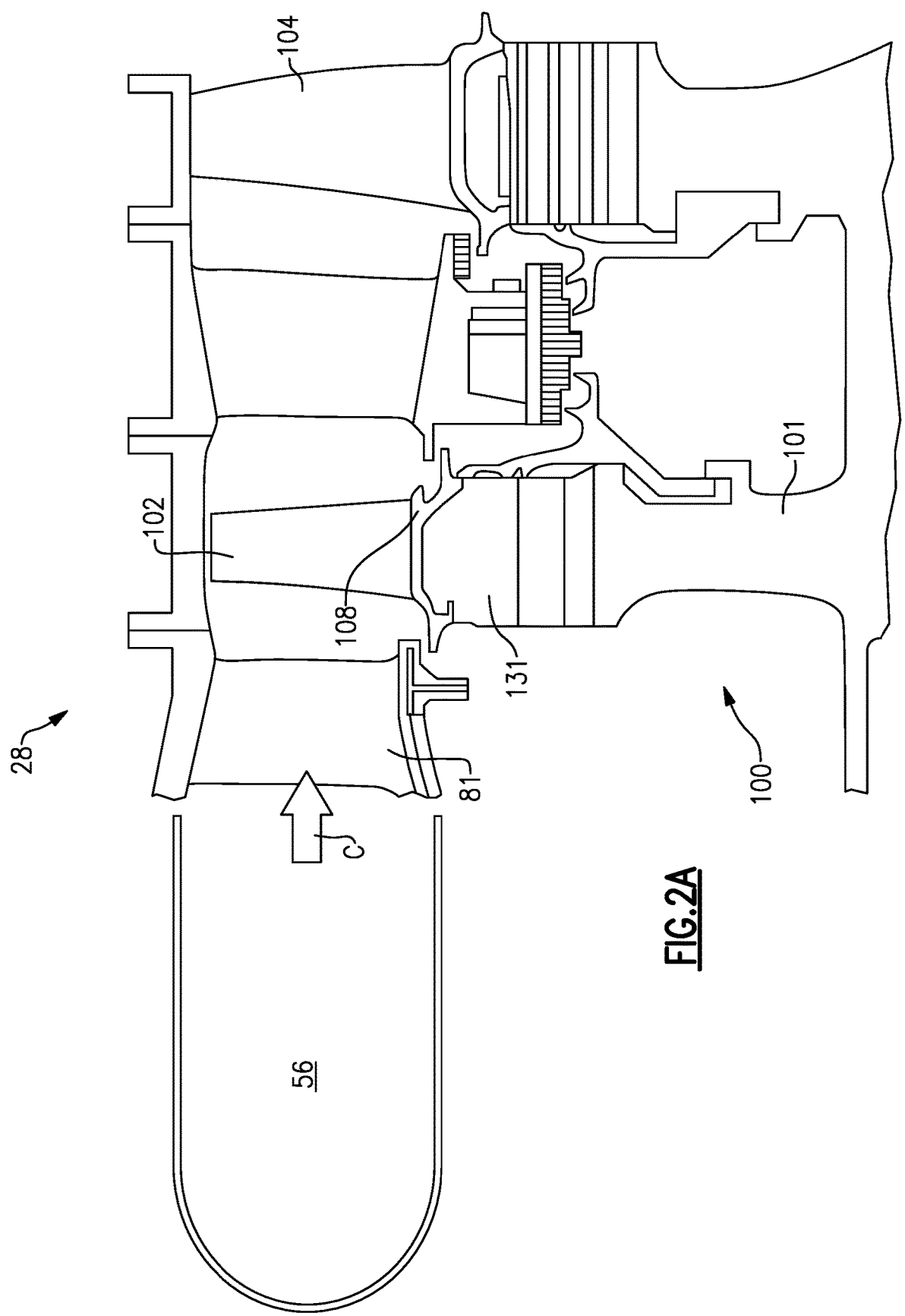
FIG. 2A shows a turbine section.

FIG. 2A shows a turbine section 28. A combustor 56 delivers products of combustion across a vane 81, and a turbine rotor 100. As known, the turbine rotor 100 includes a disk 101 receiving a first stage turbine blades 102, and a second stage turbine blades 104.

Figure 2B:
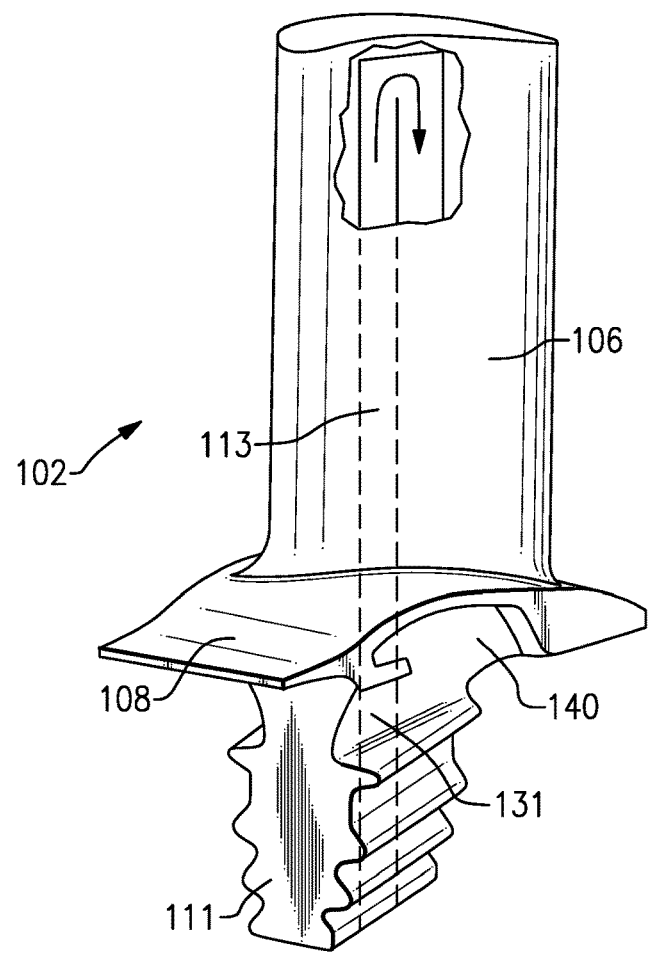
FIG. 2B shows a typical turbine blade.

FIG. 2B schematically shows a first stage turbine blade 102. As shown, the turbine blade 102 has an airfoil 106 extending radially outwardly of a platform 108. A root or fir tree 111 secures the turbine blade 102 in the disk 101 of the rotor 100. A neck 131 connects the fir tree 111 to platform 108. As shown schematically, cooling air 113 is circulated throughout the blade 102. A pressure side pocket 140 is also shown. A suction pocket is positioned on the opposed side, and illustrated in FIG. 4.

Figure 2C:
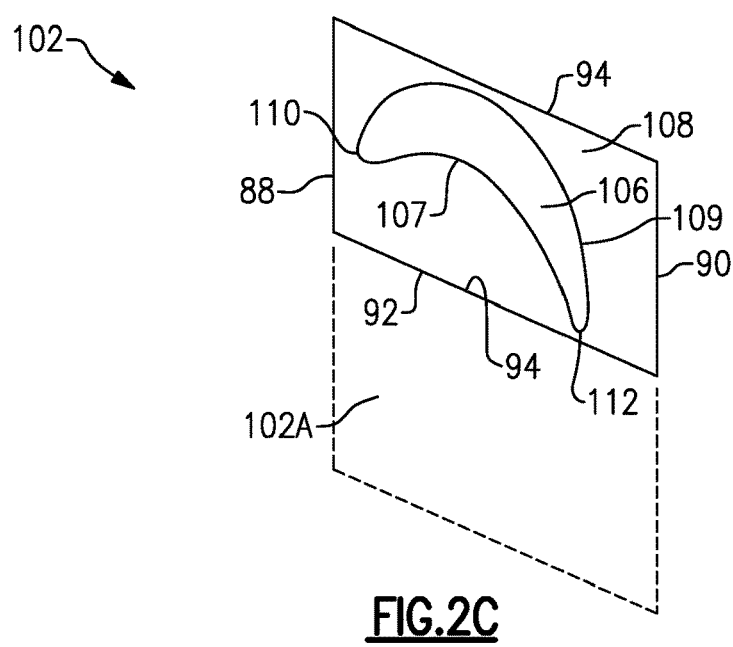
FIG. 2C is a top view of a turbine blade.

FIG. 2C shows the turbine blade platform 108 having leading edge wall 88 and trailing edge wall 90. There is a pressure side wall 92 and a suction side wall 94. The airfoil 106 extends from a leading edge 110 to a trailing edge 112. Airfoil 106 has a pressure side 107 and a suction side 109. As shown somewhat schematically, there is a circumferentially spaced blade 102A adjacent to the pressure side wall 92.

While this application discloses a first stage turbine blade for a high pressure turbine section, details of the disclosed cooling hole may benefit turbine blades at other locations.

Figure 3:
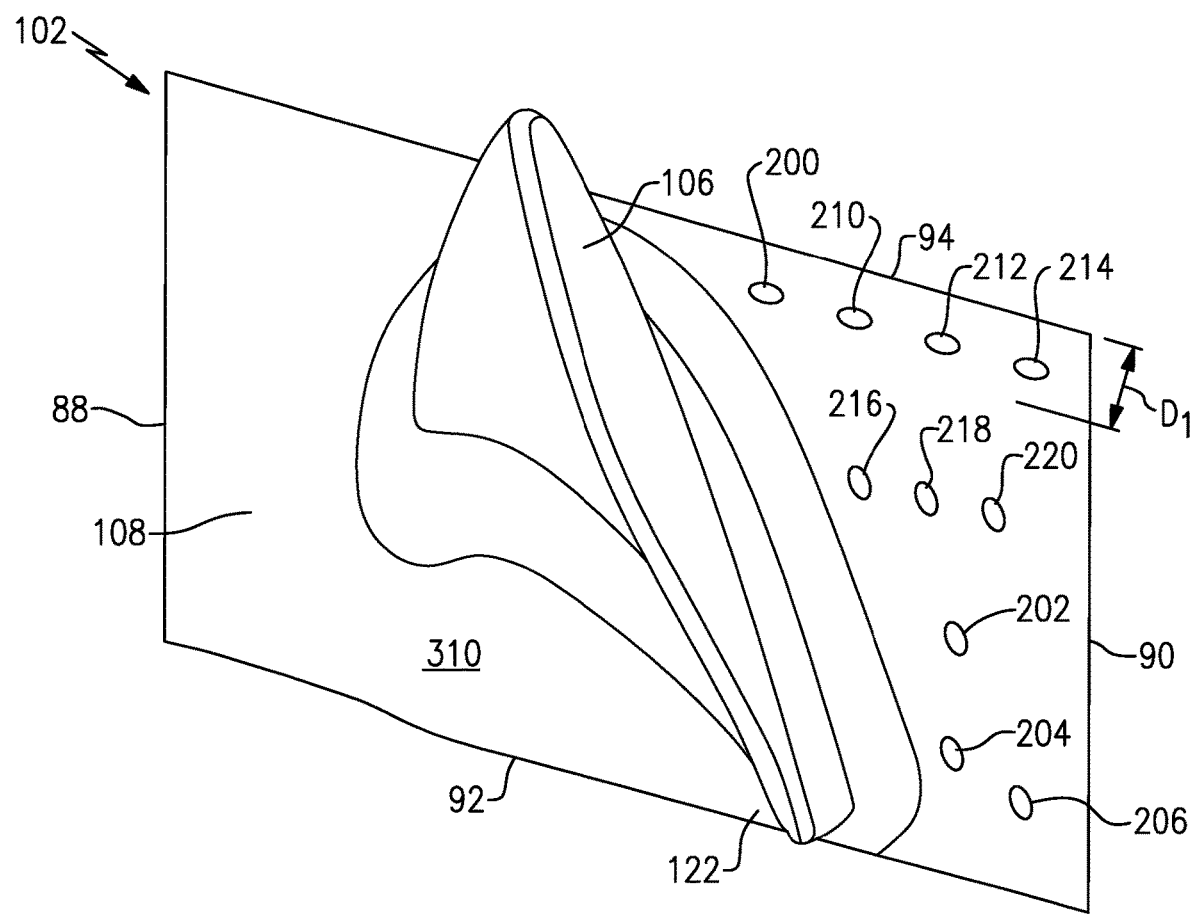
FIG. 3 shows a top view of an example turbine blade.

The turbine blade 102 is illustrated in FIG. 3, and has a platform upper surface 310. An airfoil 106 is illustrated. Adjacent to the suction side wall 94 are a plurality of cooling hole ends 200, 210, 212 and 214. As shown a distance $D_1$ can be defined away from the side wall 94. The dimension $D_1$ is less than 4 diameters for each of the holes associated with ends 200, 210, 212 and 214. That is, there are at least four cooling hole ends within the distance $D_1$ from the suction side wall 94.

Figure 4:
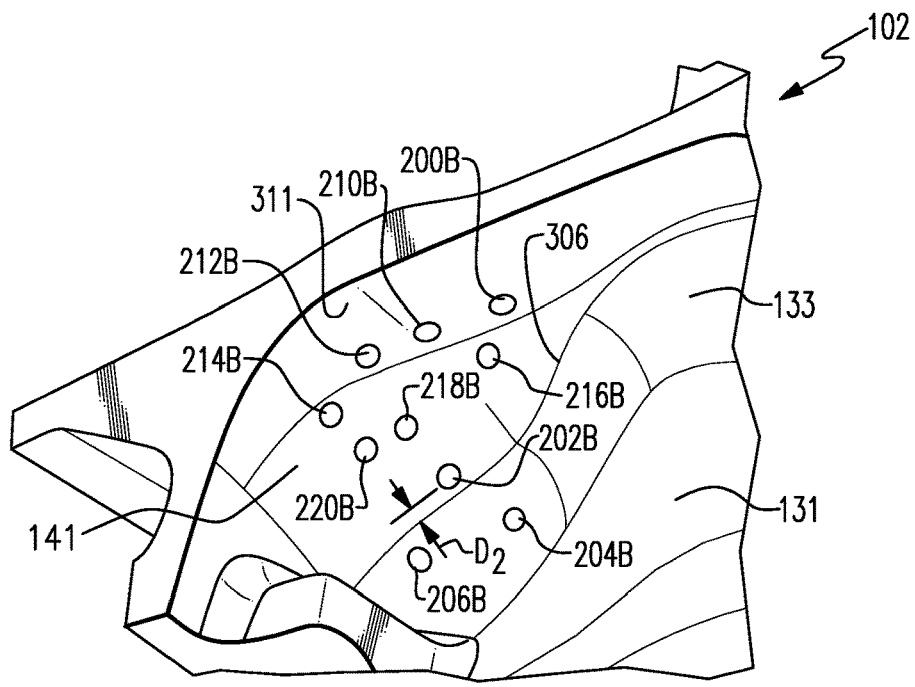
FIG. 4 shows a portion of a suction side pocket of the FIG. 3 turbine blade.
Figures 5A, 5B:
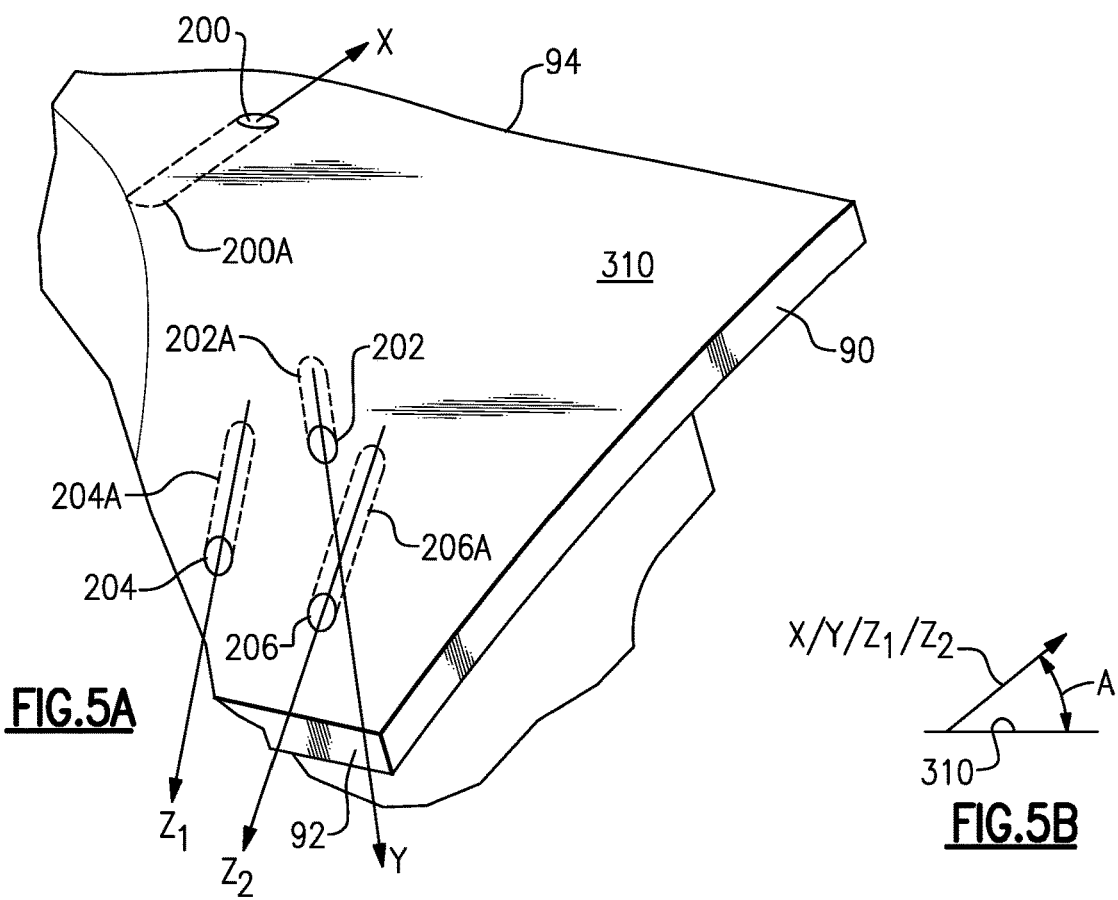
FIG. 5A is a view of the top of the platform of the FIG. 3 turbine blade.
FIG. 5B shows details of certain cooling holes illustrated in FIG. 5A.

For purposes of this application, it should also be understood that the size of the hole ends shown in FIGS. 3, 4 and 5A are somewhat exaggerated to show the fact of the hole ends. There are also hole ends 202, 204 and 206 spaced from the end wall 94 to be closer to the pressure side wall 92. In addition, hole ends 216, 218 and 220 are shown intermediate the two groups of holes. Notably, all of these hole ends are adjacent to the trailing edge side wall 90.

There are challenges with regard to cooling a suction pocket 141 as shown in FIG. 4. In the past, cooling air was supplied to cool the pocket from core airflow, such as shown schematically at 113 in FIG. 2B. That is, this core air was tapped from the passage 113 to the suction side wall 94. This is somewhat inefficient as the core airflow is already compressed, and it would be beneficial to limit the use of this core airfoil. As such, the cooling hole 200A as shown in FIG. 3 extends from end 200 to an end 200B. The cooling hole 204A extends to an end 204B. Similarly, cooling holes connect ends 202, 206, 214, 216 and 220 to cooling hole ends 202B, 206B, 214B, 216B and 220B. The suction pocket 141 has a platform underside 311, and a fillet 133 extends to an edge 306 which merges into the underside 311. The fillet 133 connects the neck 131 into the underside 311. As known, a fillet is generally a curved surface.

The hole ends 204B and 206B are formed in the fillet 133. The hole end 202B is formed in the underside 311 but adjacent to the edge 306 of the fillet 133, at a distance $D_2$. In embodiments a center of the hole end 202B is within 1-3 diameters of the cooling hole 202A away from the edge 306 of the fillet 133.

As shown in FIG. 5A, the cooling hole 200A, connect ends 200 and 200B and exits the top surface 310 of the platform 108 along a direction X. The cooling hole 202A connects ends 202 and 202B and exits along a direction Y. Similarly, the cooling hole 204A connects ends 204 and 204B to exit at a direction $Z_1$. Cooling hole 206A connect ends 206 and 206B along a direction $Z_2$. As shown, direction X would include a component toward the suction side wall 94, and a component towards the trailing edge 90. The direction Y includes a component toward the pressure side wall 92 and a component toward the trailing edge side wall 90. The directions $Z_1$ and $Z_2$ also include a component towards each of walls 90 and 92.

Since the holes do not exit either end square to the surfaces, the ends are elongated and not cylindrical. For purposes of measuring the distances $D_1$ and $D_2$ it is the diameters of holes 200A and 202A which should be used.

As can be seen, direction Y has a greater component in the direction toward the wall 90 than does direction $Z_1$ or $Z_2$.

In combination, the directions Y, $Z_1$ and $Z_2$ diffuse cooling air by overlapping the orientation and position of the holes to maximize platform film cooling in the direction of walls 90 and 92. Further, the air is directed to the adjacent blade 102A described earlier.

As shown in FIG. 5B, the directions X, Y, $Z_1$ and $Z_2$ all extend away from the top surface 310 at angles. These angles are collectively shown as A in this Figure. It should be understood that A is not shown identically for any of the four directions, and in fact the angles will be distinct. The angle A formed by direction X may be between 30 and 50 degrees. The angle formed by direction Y may be between 10 and 30 degrees. The angle formed by direction $Z_1$ may be between 10 and 30 degrees. The angle formed by direction $Z_2$ may be between 10 and 30 degrees. In embodiment, the angle A formed by direction X is greater than the angle formed by any of directions Y, $Z_1$ and $Z_2$.

It could be said this application discloses a turbine blade 102 with an airfoil 106 including a pressure side 107 and a suction side 109. There is a platform 108 including a pressure side wall 92, a suction side wall 94 and having a leading edge end wall 88 and a trailing edge end wall 90. A suction pocket 141 is positioned under the platform on the suction side. The suction pocket includes a platform underside 311, a fillet 133 connecting the platform underside into a neck 131. The neck extends into a fir tree 111. There are at least four cooling holes, with a first cooling hole 200A extending from a first end 200B in the platform underside to a second end 200 in a top surface 310 of the platform along a direction X having a component toward the suction side wall 94, and having a component towards the trailing edge end wall 90. There is a second cooling hole 202A extending from a first end 202B in the platform underside, but closer to the fillet than is the first end of the first cooling hole 202B. The second cooling hole extends along a direction Y having a component toward the pressure side end wall 92 and a component toward the trailing edge 90 to a second end 202 in the top surface. A third cooling hole 204A has a first end 204B in the fillet and extends along a direction $Z_1$ to a second end 204 at the top surface and having a component toward the pressure side end wall 92 and another component towards the trailing edge end wall 90. A fourth cooling hole 206A has a first end 206B in the fillet and extends along a direction $Z_2$ to a second end 206 in the upper surface, and having a component towards the pressure side end wall 92 and another component towards the trailing edge end wall 90.

Also, the second end 202 of the second cooling hole 202A is closer to the trailing edge side wall 90 than is the second end 204 of the third cooling hole 204A, but further from the trailing edge side wall 90 than the second end 206 of the fourth cooling hole 206A.

Although embodiments have been disclosed, a worker of ordinary skill in this art would recognize that modifications would come within the scope of this disclosure. For that reason, the following claims should be studied to determine the true scope and content of this disclosure.

What is claimed is:

1. A turbine blade comprising:
   an airfoil including a pressure side and a suction side;
   a platform including a pressure side wall and a suction side wall and having a leading edge end wall and a trailing edge end wall;
   a suction pocket positioned under the platform on the suction side;
   the suction pocket including a platform underside, and a fillet connecting said platform underside into a neck, said neck extending into a fir tree; and
   there being at least three cooling holes, with a first cooling hole extending from a first end in said platform underside to a second end in a top surface of said platform along a direction having a component toward said suction side wall, and having a component towards said trailing edge end wall, there being a second cooling hole extending from a first end in said platform underside, but closer to said fillet than is said first end of said first cooling hole, to a second end in said top surface along a direction having a component toward said pressure side end wall and a component toward said trailing edge, there being a third cooling hole having a first end in said fillet and extending to a second end at said top surface along a direction and having a component toward said pressure side end wall and another component towards said trailing edge end wall.

2. The turbine blade as set forth in claim 1, wherein there is a fourth cooling hole having a first end in said fillet and extending to a second end in said upper surface along a direction having a component towards said pressure side end wall and another component towards the trailing edge end wall.

3. The turbine blade as set forth in claim 2, wherein said first end of said second cooling hole is within 1-3 diameters of said second cooling hole from an edge of said fillet at said platform underside.

4. The turbine blade as set forth in claim 2, wherein said second end of said first cooling hole at said upper surface of said platform is within 4 diameters of said first cooling hole measured from said suction side end wall.

5. The turbine blade as set forth in claim 2, wherein there are at least three other cooling hole ends in said upper surface of said platform within a distance of 4 diameters of said first cooling hole measured from said suction side end wall.

6. The turbine blade as set forth in claim 5, wherein the component through which the direction of said second cooling hole extends towards said trailing edge is greater than the component of the direction towards said trailing edge side wall for said third and said fourth cooling holes.

7. The turbine blade as set forth in claim 6, wherein said second end of said second cooling hole is closer to said trailing edge side wall than is said second end of said third cooling hole, but further from said trailing edge side wall than said second end of said fourth cooling hole.

8. The turbine blade as set forth in claim 7, wherein the directions through which the first, second, third and fourth cooling holes extend form an angle with said top surface of said platform, and said angle associated with said first cooling hole is greater than said angles associated with said second, third and fourth cooling hole.

9. The turbine blade as set forth in claim 2, wherein the component through which the direction of said second cooling hole extends towards said trailing edge is greater than the component of the direction towards said trailing edge side wall for said third and said fourth cooling holes.

10. The turbine blade as set forth in claim 2, wherein said second end of said second cooling hole is closer to said trailing edge side wall than is said second end of said third cooling hole, but further from said trailing edge side wall than said second end of said fourth cooling hole.

11. The turbine blade as set forth in claim 2, wherein the directions through which the first, second, third and fourth cooling holes extend form an angle with said top surface of said platform, and said angle associated with said first cooling hole is greater than said angles associated with said second, third and fourth cooling holes.

12. A gas turbine engine comprising:
    a compressor section;
    a combustor;
    a turbine section having at least one turbine blade; and
    the at least one turbine blade including:
       an airfoil including a pressure side and a suction side;
       a platform including a pressure side wall and a suction side wall and having a leading edge end wall and a trailing edge end wall;
       a suction pocket positioned under the platform on the suction side;
       the suction pocket including a platform underside, and a fillet connecting said platform underside into a neck, said neck extending into a fir tree; and
       there being at least three cooling holes, with a first cooling hole extending from a first end in said platform underside to a second end in a top surface of said platform along a direction having a component toward said suction side wall, and having a component towards said trailing edge end wall, there being a second cooling hole extending from a first end in said platform underside, but closer to said fillet than is said first end of said first cooling hole, to a second end in said top surface along a direction having a component toward said pressure side end wall and a component toward said trailing edge, there being a third cooling hole having a first end in said fillet and extending to a second end at said top surface along a direction and having a component toward said pressure side end wall and another component towards said trailing edge end wall.

13. The gas turbine engine as set forth in claim 12, wherein there is a fourth cooling hole having a first end in said fillet and extending to a second end in said top surface, along a direction having a component towards said pressure side end wall and another component towards the trailing edge end wall.

14. The gas turbine engine as set forth in claim 13, wherein said second end of said first cooling hole at said upper surface of said platform is within 4 diameters of said first cooling hole measured from said suction side end wall, and there are at least three other cooling hole ends in said upper surface of said platform within a distance of 4 diameters of said first cooling hole measured from said suction side end wall.

15. The gas turbine engine as set forth in claim 14, wherein said second end of said second cooling hole is closer to said trailing edge side wall than is said second end of said third cooling hole, but further from said trailing edge side wall than said second end of said fourth cooling hole.

16. The gas turbine engine as set forth in claim 15, wherein the directions through which the first, second, third and fourth cooling holes extend form an angle with said top surface of said platform, and said angle associated with said first cooling hole is greater than said angles associated with said second, third and fourth cooling holes.

17. The gas turbine engine as set forth in claim 13, wherein the component through which the direction of said second cooling hole extends towards said trailing edge is greater than the component of the direction towards said trailing edge side wall for said third and said fourth cooling holes.

18. The gas turbine engine as set forth in claim 13, wherein said second end of said second cooling hole is closer to said trailing edge side wall than is said second end of said third cooling hole, but further from said trailing edge side wall than said second end of said fourth cooling hole.

19. The gas turbine engine as set forth in claim 13, wherein the directions through which the first, second, third and fourth cooling holes extend form an angle with said top surface of said platform, and said angle associated with said first cooling hole is greater than said angles associated with said second, third and fourth cooling holes.

20. The gas turbine engine as set forth in claim 12, wherein said first end of said second cooling hole is within 1-3 diameters of said second cooling hole from an edge of said fillet at said platform underside.

* * * * *